(12) United States Patent
Karito

(10) Patent No.: US 12,138,791 B2
(45) Date of Patent: Nov. 12, 2024

(54) ROBOT CONTROL SYSTEM, LOWER-LEVEL CONTROL APPARATUS, AND CONTROL METHOD FOR ROBOT

(71) Applicant: SEIKO EPSON CORPORATION, Tokyo (JP)

(72) Inventor: Nobuhiro Karito, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 318 days.

(21) Appl. No.: 17/718,354

(22) Filed: Apr. 12, 2022

(65) Prior Publication Data

US 2022/0331951 A1  Oct. 20, 2022

(30) Foreign Application Priority Data

Apr. 14, 2021 (JP) ................................. 2021-068185

(51) Int. Cl.
*G06F 17/00* (2019.01)
*B25J 9/16* (2006.01)
*G05B 19/4155* (2006.01)

(52) U.S. Cl.
CPC .......... *B25J 9/161* (2013.01); *G05B 19/4155* (2013.01); *G05B 2219/50391* (2013.01)

(58) Field of Classification Search
CPC ........ B25J 9/161; B25J 9/1628; B25J 9/1602; B25J 9/1664; B25J 9/1694; G05B 19/4155; G05B 2219/50391; G05B 2219/25456; G05B 2219/39529; G05B 19/4148
USPC ........................................................ 700/249
See application file for complete search history.

(56) References Cited

U.S. PATENT DOCUMENTS

| | | | |
|---|---|---|---|
| 7,570,820 B2* | 8/2009 | Karito | H04N 1/4058 |
| | | | 382/232 |
| 10,059,001 B2* | 8/2018 | Miyazawa | B25J 9/1697 |
| 11,389,958 B2* | 7/2022 | Karito | B25J 9/1633 |
| 2006/0146776 A1 | 7/2006 | Kim | |
| 2015/0120058 A1* | 4/2015 | Karito | B25J 9/1612 |
| | | | 901/9 |

(Continued)

FOREIGN PATENT DOCUMENTS

JP 2006224294 A 8/2006

OTHER PUBLICATIONS

Design and Validation of a Low-Level Controller for Hierarchically Controlled Exoskeletons (Year: 2023).*

*Primary Examiner* — Ronnie M Mancho
(74) *Attorney, Agent, or Firm* — Samson G. Yu

(57) ABSTRACT

A robot control system includes a robot having a servo control unit, a lower-level control apparatus transmitting a control command to the servo control unit and receiving robot status information representing a status of the robot from the servo control unit with respect to each preset control period, and an upper-level control apparatus transmitting command information for creation of the control command to the lower-level control apparatus. The lower-level control apparatus transmits the robot status information to the upper-level control apparatus in synchronization with the control period. The upper-level control apparatus transmits the command information to the lower-level control apparatus within a predetermined transmission time shorter than the control period from a time when receiving the robot status information from the lower-level control apparatus.

6 Claims, 6 Drawing Sheets

(56) References Cited

U.S. PATENT DOCUMENTS

2021/0268651 A1\* 9/2021 Karito .................... B25J 9/1664

\* cited by examiner

ROBOT CONTROL SYSTEM, LOWER-LEVEL CONTROL APPARATUS, AND CONTROL METHOD FOR ROBOT

The present application is based on, and claims priority from JP Application Serial Number 2021-068185, filed Apr. 14, 2021, the disclosure of which is hereby incorporated by reference herein in its entirety.

BACKGROUND

1. Technical Field

The present disclosure relates to a robot control system, a lower-level control apparatus, and a control method for a robot.

2. Related Art

JP-A-2006-224294 discloses a robot control system including a service server and a robot terminal. In the robot control system, the service server collects operation control data, voice data, etc. synchronized with each other and creates the data as one packet and transmits the packet to the robot terminal.

However, in the related art, the service server transmits the packet to the robot terminal at an arbitrary time and synchronization of the transmission and the reception of the packet with a control period of the robot is not considered, and the time until reflection on a real motion after the transmission of the packet is inconstant. Accordingly, there is a problem that the configuration is not applicable to uses requiring responsiveness.

SUMMARY

According to a first aspect of the present disclosure, a robot control system is provided. The robot control system includes a robot having a servo control unit, a lower-level control apparatus transmitting a control command to the servo control unit and receiving robot status information representing a status of the robot from the servo control unit with respect to each preset control period, and an upper-level control apparatus transmitting command information for creation of the control command to the lower-level control apparatus. The lower-level control apparatus transmits the robot status information to the upper-level control apparatus in synchronization with the control period. The upper-level control apparatus transmits the command information to the lower-level control apparatus within a predetermined transmission time shorter than the control period from a time when receiving the robot status information from the lower-level control apparatus.

According to a second aspect of the present disclosure, a lower-level control apparatus forming a robot control system with a robot and an upper-level control apparatus is provided. The lower-level control apparatus is configured to execute (a) processing of transmitting a control command to a servo control unit of the robot and receiving robot status information representing a status of the robot from the servo control unit with respect to each preset control period, (b) processing of transmitting the robot status information to the upper-level control apparatus in synchronization with the control period, and (c) processing of receiving command information from the upper-level control apparatus and creating a next control command from the command information. In the processing (c), when failed to receive the command information from the upper-level control apparatus until a time-out time before a time to transmit the next control command to the servo control unit, creating and transmitting the next control command using a previous control command without using the command information to the servo control unit.

According to a third aspect of the present disclosure, a control method for a robot in a robot control system including the robot having a servo control unit, a lower-level control apparatus, and an upper-level control apparatus is provided. The control method includes (a) transmitting a control command to the servo control unit and receiving robot status information representing a status of the robot from the servo control unit with respect to each preset control period by the lower-level control apparatus, and (b) transmitting command information for creation of the control command to the lower-level control apparatus by the upper-level control apparatus. At (a), the lower-level control apparatus transmits the robot status information to the upper-level control apparatus in synchronization with the control period. At (b), the upper-level control apparatus transmits the command information to the lower-level control apparatus within a predetermined transmission time shorter than the control period from a time when receiving the robot status information from the lower-level control apparatus.

DESCRIPTION OF EXEMPLARY EMBODIMENTS

Figure 1:
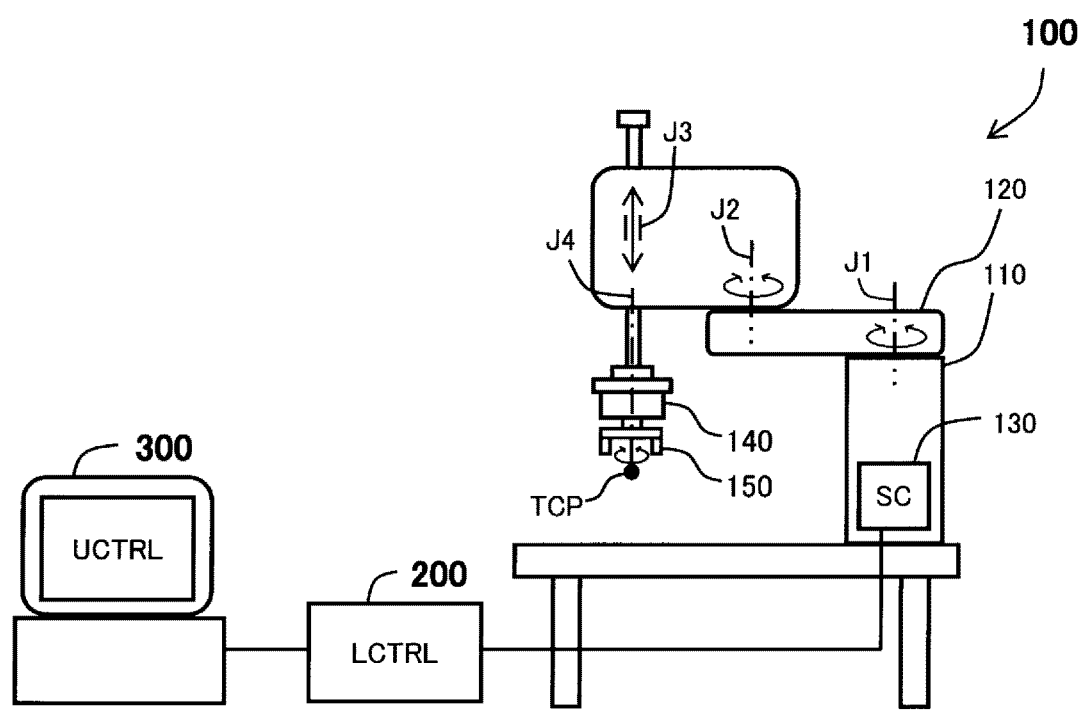
FIG. 1 is an explanatory diagram showing a robot control system in an embodiment.

FIG. 1 is an explanatory diagram showing an example of a robot control system in one embodiment. The robot control system includes a robot 100, a lower-level control apparatus 200 transmitting a control command CC to the robot 100, and an upper-level control apparatus 300 transmitting command information CI for creation of the control command CC to the lower-level control apparatus 200. The lower-level control apparatus 200 is e.g. a robot controller and the upper-level control apparatus 300 is e.g. a personal computer. Note that the lower-level control apparatus 200 can be referred to as "first control apparatus" and the upper-level control apparatus 300 can be referred to as "second control apparatus".

The robot 100 includes a base 110, a robot arm 120, and a servo control unit 130. The servo control unit 130 executes servo control on actuators moving joints of the robot arm 120. The servo control unit 130 is coupled to the lower-level control apparatus 200.

The robot arm 120 is sequentially coupled by four joints J1 to J4. A force sensor 140 and an end effector 150 are attached to the distal end portion of the robot arm 120. The force sensor 140 may be omitted. Further, another sensor including a gyro sensor and a vibration sensor may be provided in the robot arm 120. A TCP (Tool Center Point) as a control point for the robot 100 is set near the distal end of the robot arm 120. In the embodiment, a four-axis robot having the four joints J1 to J4 is exemplified, however, a robot including any arm mechanism having a plurality of joints can be used. The robot 100 of the embodiment is a horizontal articulated robot, however, a vertical articulated robot may be used.

Figure 2:
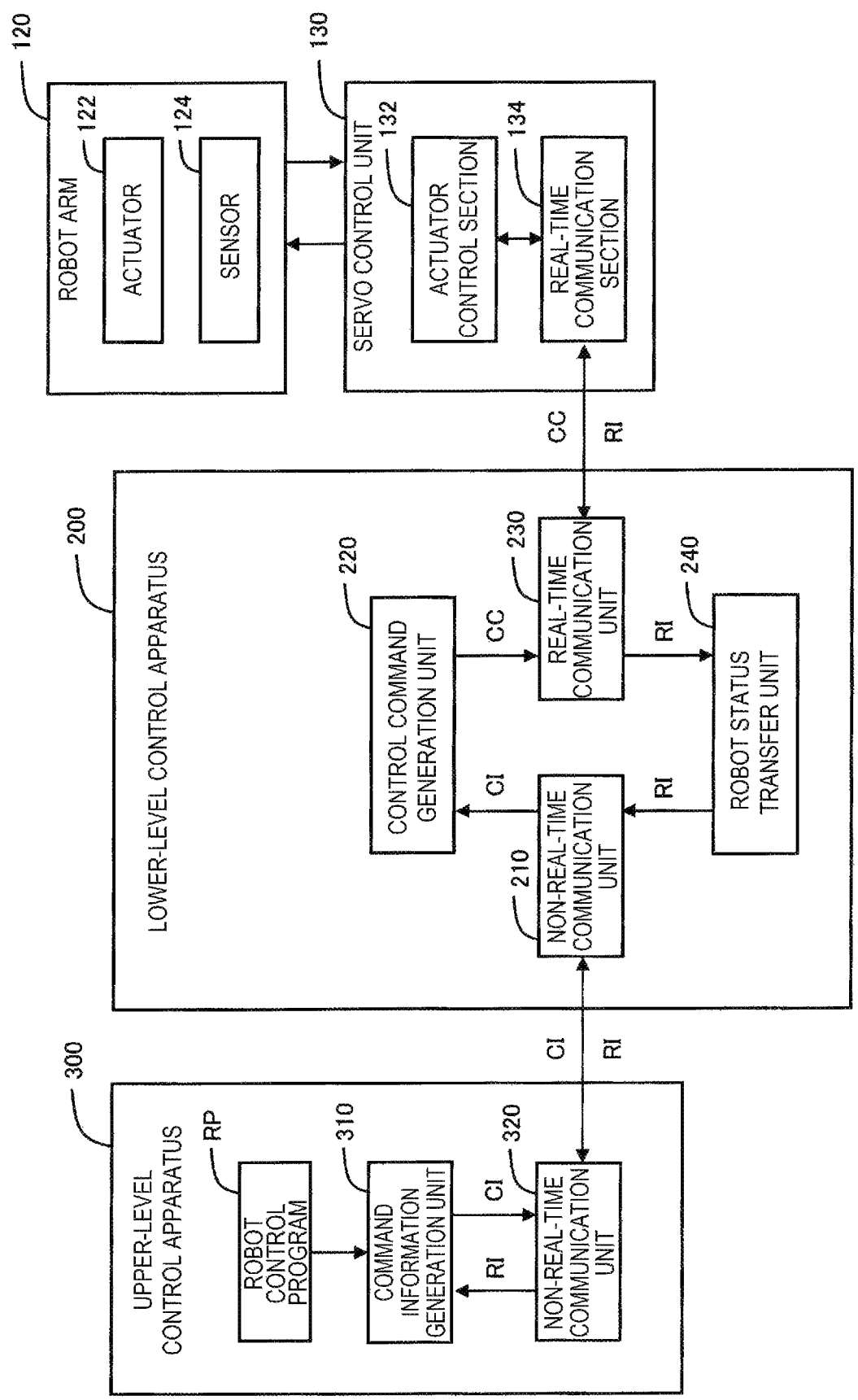
FIG. 2 is a functional block diagram of the robot control system.

FIG. 2 is a functional block diagram of the robot control system. The lower-level control apparatus 200 transmits the control command CC to the servo control unit 130 and controls the robot 100 and receives robot status information RI from the servo control unit 130 and transmits the information to the upper-level control apparatus 300 in synchronization with a predetermined control period of the robot. The upper-level control apparatus 300 may create the next command information CI using the robot status information RI as necessary. The upper-level control apparatus 300 transmits the command information CI to the lower-level control apparatus 200 within a predetermined transmission time shorter than the control period of the robot from the time when receiving the robot status information RI.

The robot arm 120 includes actuators 122 and sensors 124. The actuators 122 are provided in the individual joints and used for moving the individual joints. The actuators 122 include encoders as position sensors indicating the positions of the respective joints. In the present disclosure, the position of the joint refers to a displacement or an angle of the joint. The sensors 124 include various sensors including the force sensor 140 shown in FIG. 1. The robot status information RI is information representing the status of the robot 100 and contains position data as detection values of the encoders in the plurality of joints and sensor values as detection values of the sensors 124.

The servo control unit 130 has an actuator control section 132 executing control of the actuators 122 and a real-time communication section 134. The real-time communication section 134 has a function of making synchronous communications with the lower-level control apparatus 200 with the control period of the robot. In the embodiment, the control period of the robot is 1024 µs, however, the explanation will be made with the control period as 1 ms by simplification. The servo control unit 130 and the lower-level control apparatus 200 are connected by a protocol that can make real-time communications at a constant period e.g. EtherCAT (Ethernet Control Automation Technology). In EtherCAT, digital data, analog data, and process data in which input and output information including the encoder values is connected may be exchanged on Ethernet frames. In the EtherCAT connection, the lower-level control apparatus 200 functions as a master and the servo control unit 130 functions as a slave. The lower-level control apparatus 200 and the upper-level control apparatus 300 are connected by a protocol for non-real-time communication, e.g. Ethernet.

The upper-level control apparatus 300 has a command information generation unit 310 and a non-real-time communication unit 320. The command information generation unit 310 generates a trajectory of the robot arm 120 according to a robot control program RP created in advance, and creates the command information CI for moving the robot arm 120 according to the trajectory. The command information CI contains a position command for moving the robot arm 120. The position command is a command indicating the positions or displacement of the plurality of actuators of the robot arm 120 and indicates a position in 1-ms period as the control period of the robot. The non-real-time communication unit 320 executes non-real-time communication with a non-real-time communication unit 210 of the lower-level control apparatus 200. As described above, in the embodiment, the upper-level control apparatus 300 and the lower-level control apparatus 200 are connected by Ethernet. In the non-real-time communication, the command information CI is transmitted from the upper-level control apparatus 300 to the lower-level control apparatus 200, and the robot status information RI is transmitted from the lower-level control apparatus 200 to the upper-level control apparatus 300. As described above, the robot status information RI contains the position data of the respective joints of the robot arm 120 and the sensor values of the sensors 124.

The command information generation unit 310 executes processing of creating the command information CI according to the robot control program RP. As the processing on the command information CI, one of the following pieces of processing can be selected and executed:

(i) First processing of creating the command information CI according to the robot control program RP without using the robot status information RI received from the lower-level control apparatus 200;

(ii) Second processing of creating the command information CI using the robot status information RI according to the robot control program RP.

Which of these two pieces of processing is selected and executed is described in the robot control program RP in advance. In this manner, the command information generation unit 310 creates the command information CI using the robot status information RI as necessary, and thereby, the lower-level control apparatus 200 may move the robot 100 by transmitting the control command CC on which the robot status information RI is reflected to the servo control unit 130. Note that the second processing may be constantly executed instead of selectively executing the above described two pieces of processing.

Examples of creation of the command information CI using the robot status information RI in the second processing are as follows:

(1) changing a parameter of force control contained in the command information CI using the sensor value of the force sensor 140;

(2) creating the command information CI in which an amount of displacement by force control is added to displacement by position control using the sensor value of the force sensor 140; and (3) creating the command information CI to start acceleration or deceleration of the control point when the encoder value of a specific joint reaches a value indicating a specific angle.

The lower-level control apparatus 200 has the non-real-time communication unit 210, a control command generation unit 220, a real-time communication unit 230, and a robot status transfer unit 240. The command information CI transmitted from the upper-level control apparatus 300 is received by the non-real-time communication unit 210 and transferred to the control command generation unit 220. The control command generation unit 220 creates the control command CC according to the command information CI. The control command CC contains substantially the same position command as the position command for 1-ms period contained in the command information CI. The control command CC may be the same as the command information CI. The real-time communication unit 230 transmits the control command CC to the servo control unit 130 and receives the robot status information RI from the servo control unit 130 with respect to each control period of the robot. The robot status information RI is transmitted from the robot status transfer unit 240 via the non-real-time communication unit 210 to the upper-level control apparatus 300.

Note that, when the communication between the upper-level control apparatus 300 and the lower-level control apparatus 200 is normal, the control command CC created in the control command generation unit 220 contains the same position command as that of the command information CI received from the upper-level control apparatus 300. On the other hand, when the communication between the control apparatuses is delayed, the control command generation unit 220 creates the next control command CC without waiting for the reception of the command information CI from the upper-level control apparatus 300. This processing will be further described in later.

Figure 3:
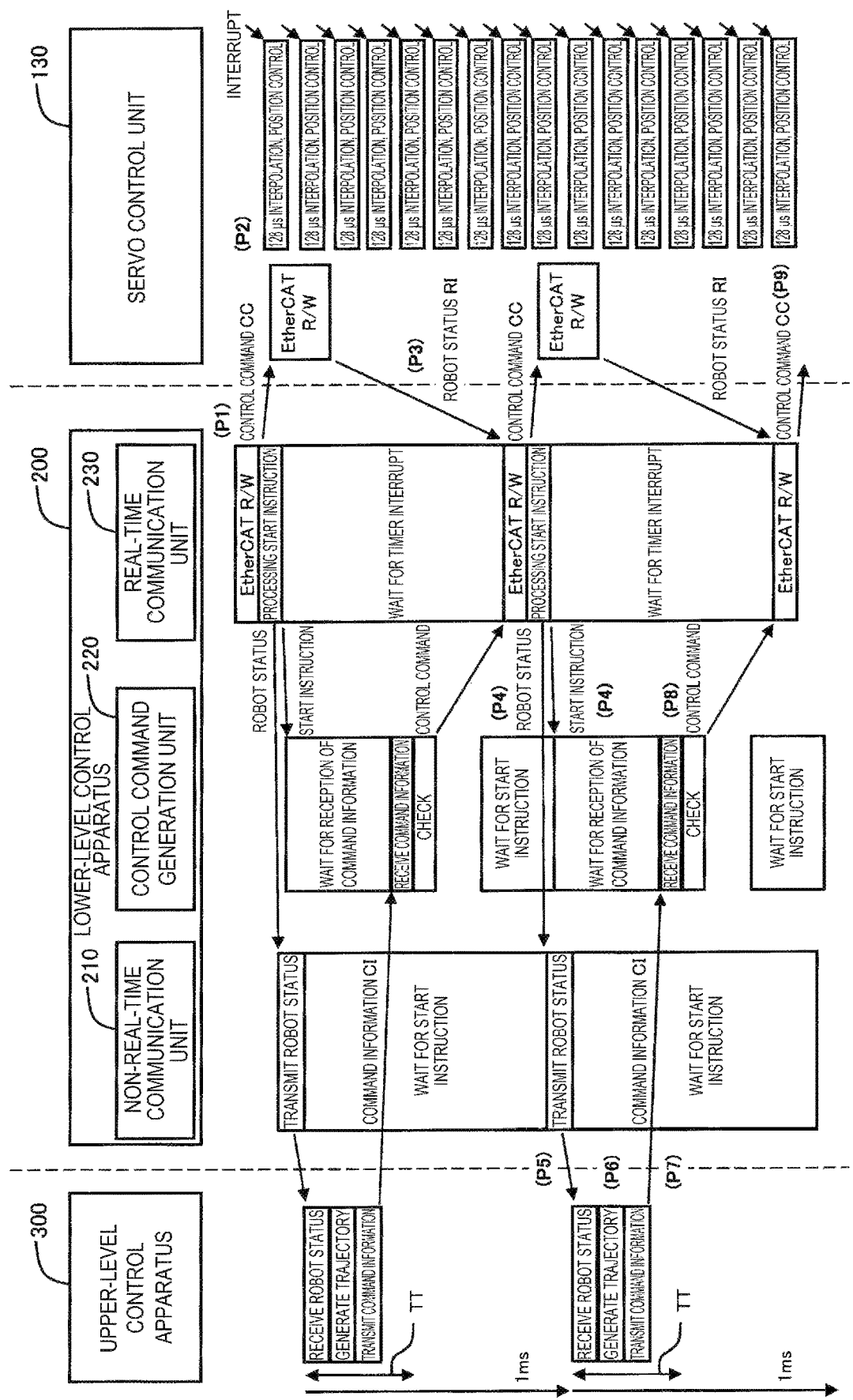
FIG. 3 is a sequence diagram when communication between control apparatuses is normal.

FIG. 3 is a sequence diagram when the communication between the control apparatuses is normal. Note that, in the following description, various kinds of processing will be explained in the order of the processing P1 to P10 shown in FIG. 3. In FIG. 3, for convenience of illustration, the robot status transfer unit 240 is not shown, and "robot status information" is simply described as "robot status".

The lower-level control apparatus 200 operates with a constant control period using timer interrupt of the lower-level control apparatus 200. As described above, the control period is 1 ms. Specifically, the real-time communication unit 230 of the lower-level control apparatus 200 executes read/write, i.e., transmission and reception by the EtherCAT protocol in response to the timer interrupt with respect to each control period of 1 ms. The times of transmission and reception by the real-time communication unit 230 are reference times for control of the operation times of the other respective units.

In the processing P1, the real-time communication unit 230 transmits the control command CC to the servo control unit 130 at the time of timer interrupt. The control command CC contains the position command for 1-ms period with respect to each joint of the robot arm 120. In the processing P2, the servo control unit 130 controls the actuators 122 of the robot arm 120 by interpolating the received position command for 1-ms period in a plurality of position commands for more shorter divisional control periods. In the example of FIG. 3, the divisional control period is a 128-µs period. Further, in the processing P3, the servo control unit 130 transmits the robot status information RI to the lower-level control apparatus 200. As described above, the robot status information RI contains the position data of the respective joints and the sensor values of the sensors 124. The real-time communication unit 230 of the lower-level control apparatus 200 transmits the control command CC to the servo control unit 130, and then, in the processing P4, respectively instructs the control command generation unit 220 and the robot status transfer unit 240 to start the operation. As described above, the robot status transfer unit 240 is not shown in FIG. 3. Note that both the control command generation unit 220 and the robot status transfer unit 240 execute tasks in real time and, when receiving start instructions, start operation with small jitter less than several tens of microseconds. The jitter refers to a difference of the interval between the previous start time and the present start time from an expected value, 1024 µs. In the processing P5, the robot status transfer unit 240 transfers the robot status information RI received from the servo control unit 130 via the non-real-time communication unit 210 to the upper-level control apparatus 300.

In the processing P6, the command information generation unit 310 of the upper-level control apparatus 300 confirms the reception of the robot status information RI, executes calculation of a trajectory for the next position command, and generates the command information CI containing the position command. When the generation of the command information CI ends, in the processing P7, the upper-level control apparatus 300 promptly transmits the command information CI containing the position command to the lower-level control apparatus 200. A unique serial sequence number is assigned to the command information CI. When the processing within the upper-level control apparatus 300 and the communication between the control apparatuses are normally executed, the transmission of the command information CI is executed within a predetermined transmission time TT shorter than 1 ms as the control period of the robot from the time when the robot status information RI is received. The upper-level control apparatus 300 does not operate with a real-time OS and, it is impossible to transmit the next command information CI in less than several tens of microseconds after the robot status information RI is received from the lower-level control apparatus 200, however, if the command information CI can be transmitted within the transmission time TT from the time when the robot status information RI is received, the transmission may be in time for the time when the lower-level control apparatus 200 transmits the next control command CC to the servo control unit 130.

The control command generation unit 220 of the lower-level control apparatus 200 waits for transmission of the command information CI from the upper-level control apparatus 300 after an instruction on the operation start is given from the real-time communication unit 230. In the processing P8, when receiving the command information CI from the upper-level control apparatus 300, the control command generation unit 220 checks the sequence number attached to the command information CI and checks whether or not the position, the velocity, the acceleration indicated by the position command exceed limits. When the command information CI does not have an abnormality, in the processing P9, the control command generation unit 220 creates and transmits the control command CC containing the position command and transmits the command via the real-time communication unit 230 to the servo control unit 130.

As described above, the lower-level control apparatus 200 transmits the robot status information RI in synchronization with a predetermined control period to the upper-level control apparatus 300, and the upper-level control apparatus 300 transmits the command information CI within the predetermined transmission time TT shorter than the control period from the time when receiving the robot status information RI from the lower-level control apparatus 200. In the robot control system, the communication between the upper-level control apparatus 300 and the lower-level control apparatus 200 is performed within the transmission time TT shorter than the control period of the robot, and accordingly, the lower-level control apparatus 200 may transmit the control command CC to the servo control unit 130 with respect to each control period and execute a robot motion requiring responsiveness. Note that, when the communication from the upper-level control apparatus 300 to the lower-level control apparatus 200 is largely delayed, the processing is executed in the following manner.

Figure 4:
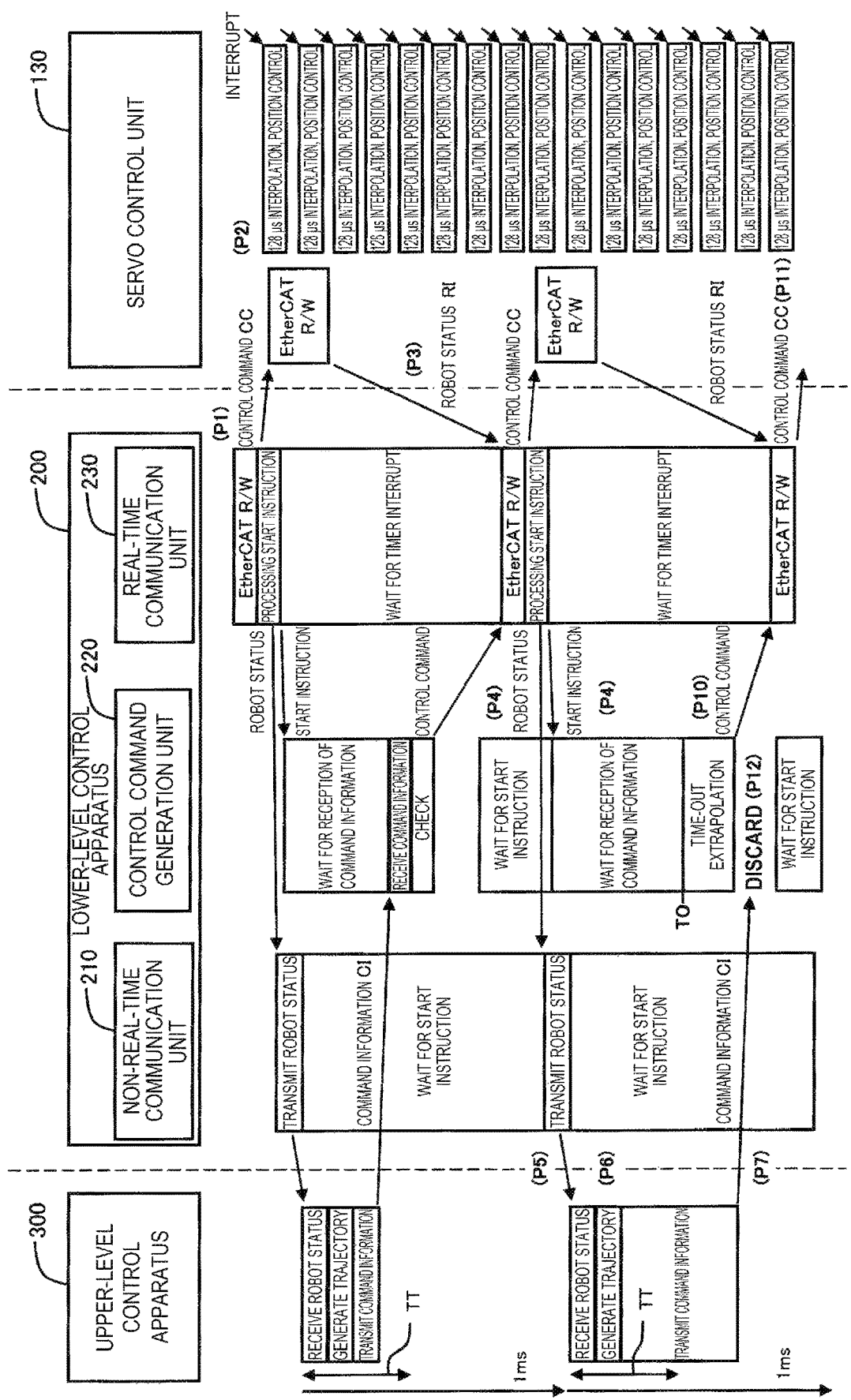
FIG. 4 is a sequence diagram when time-out occurs in the communication between the control apparatuses.

FIG. 4 is a sequence diagram when time-out occurs in the communication between the control apparatuses. The processing P1 to P7 is the same as that in FIG. 3. In FIG. 4, a case where the command information CI transmitted from the upper-level control apparatus 300 to the lower-level control apparatus 200 in the processing P7 is late for the control period of the robot 100, that is, the late for time when the next control command CC is transmitted from the lower-level control apparatus 200 to the servo control unit 130 is assumed. Specifically, the transmission of the command information CI in the processing P7 in FIG. 4 occurs after a lapse of the normal transmission time TT. In this case, in the processing P10, the processing of waiting for the reception of the command information CI from the upper-level control apparatus 300 times out. The determination of time-out is performed according to whether or not the command information CI is received from the upper-level control apparatus 300 by a time-out time TO before the time to transmit the next control command CC to the servo control unit 130. The period from the time-out time TO to the transmission time of the next control command CC can be set to a period longer than zero e.g. 0.1 to 0.2 ms. The transmission time TT of the upper-level control apparatus 300 is set so that the lower-level control apparatus 200 does not time out. That is, the transmission time TT is set so that the command information CI may be received by the lower-level control apparatus 200 by the time-out time TO when the upper-level control apparatus 300 transmits the command information CI to the lower-level control apparatus 200 within the transmission time TT from the time receiving the robot status information RI.

When the time-out occurs, the control command generation unit 220 performs extrapolation of the position command using the previous control command CC and generates the next control command CC. It is preferable to use the latest control commands CC at a predetermined number of times equal to or more than twice as the control commands CC in the past. Further, the control command generation unit 220 checks whether or not the position, the velocity, the acceleration exceed limits with respect to the position command contained in the next control command CC. When the control command CC does not have an abnormality, in the processing P11, the control command generation unit 220 transmits the control command CC via the real-time communication unit 230 to the servo control unit 130. As described above, when the time-out occurs, the next control command CC is generated by extrapolation of the control commands CC in the past, and thereby, even when the command information CI transmitted from the upper-level control apparatus 300 to the lower-level control apparatus 200 is delayed, the appropriate control command CC may be transmitted to the servo control unit 130.

The command information CI transmitted from the upper-level control apparatus 300 after the time-out occurs is discarded in the processing P12. As described above, the unique serial sequence number is assigned to the command information CI. The control command generation unit 220 discards the command information CI, but executes update of the sequence number. Therefore, when receiving the next command information CI, the control command generation unit 220 can determine whether or not the command information CI is the expected command information CI from the sequence number contained in the information.

Note that, in the example of FIG. 4, when the time-out occurs in the communication, the next control command CC is extrapolated from the control commands CC in the past, however, the next control command CC may be created using another method than the extrapolation. For example, the same control command as the previous control command CC may be employed as the next control command CC. As described above, when failed to receive the command information CI by the predetermined time-out time TO, the lower-level control apparatus 200 may create the next control command CC using the control commands CC in the past without using the command information CI transmitted from the upper-level control apparatus 300 and transmit the command to the lower-level control apparatus 200. In this manner, even when the command information CI transmitted from the upper-level control apparatus 300 to the lower-level control apparatus 200 is delayed, the robot 100 may be operated.

Figure 5:
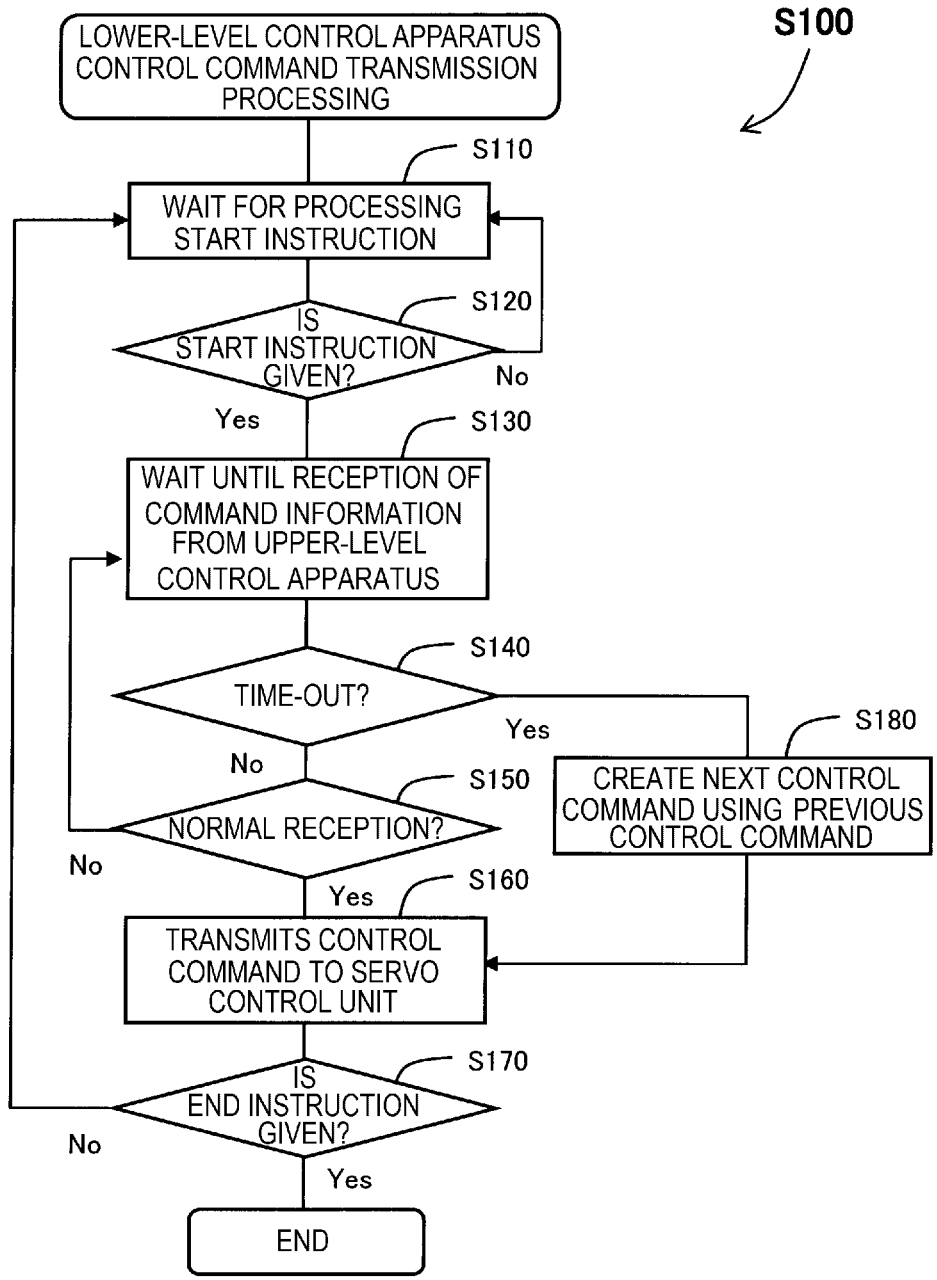
FIG. 5 is a flowchart showing a procedure of transmission processing of a control command by a lower-level control apparatus.

FIG. 5 is a flowchart showing a procedure of transmission processing of the control command CC by the lower-level control apparatus 200. At steps S110, S120, the control command generation unit 220 waits until reception of a processing start instruction from the real-time communication unit 230. When receiving the processing start instruction, at step S130, the control command generation unit 220 waits until reception of the command information CI from the upper-level control apparatus 300. When the reception of the command information CI does not time out at step S140 and a normality of the command information CI is confirmed at step S150, the process goes to step S160 and the control command generation unit 220 creates the next control command CC from the command information CI and transmits the control command to the servo control unit 130. On the other hand, when the time-out occurs at step S140, the process goes to step S180 and the control command generation unit 220 creates the next control command CC using the control commands CC in the past and transmits the command to the servo control unit 130. The processing at step S180 corresponds to the processing P10, P11 described in FIG. 4. When the command information CI is not normal at step S150, the command information CI is discarded and retransmission of the command information CI is requested to the upper-level control apparatus 300, and the process returns to step S130.

At step S170, the control command generation unit 220 determines whether or not an end instruction on the processing is received and, when not received, the process returns to step S110 and the processing at step S110 and the subsequent steps is repeated. Note that the end instruction on the processing is transmitted from the upper-level control apparatus 300 to the lower-level control apparatus 200, for example.

Figure 6:
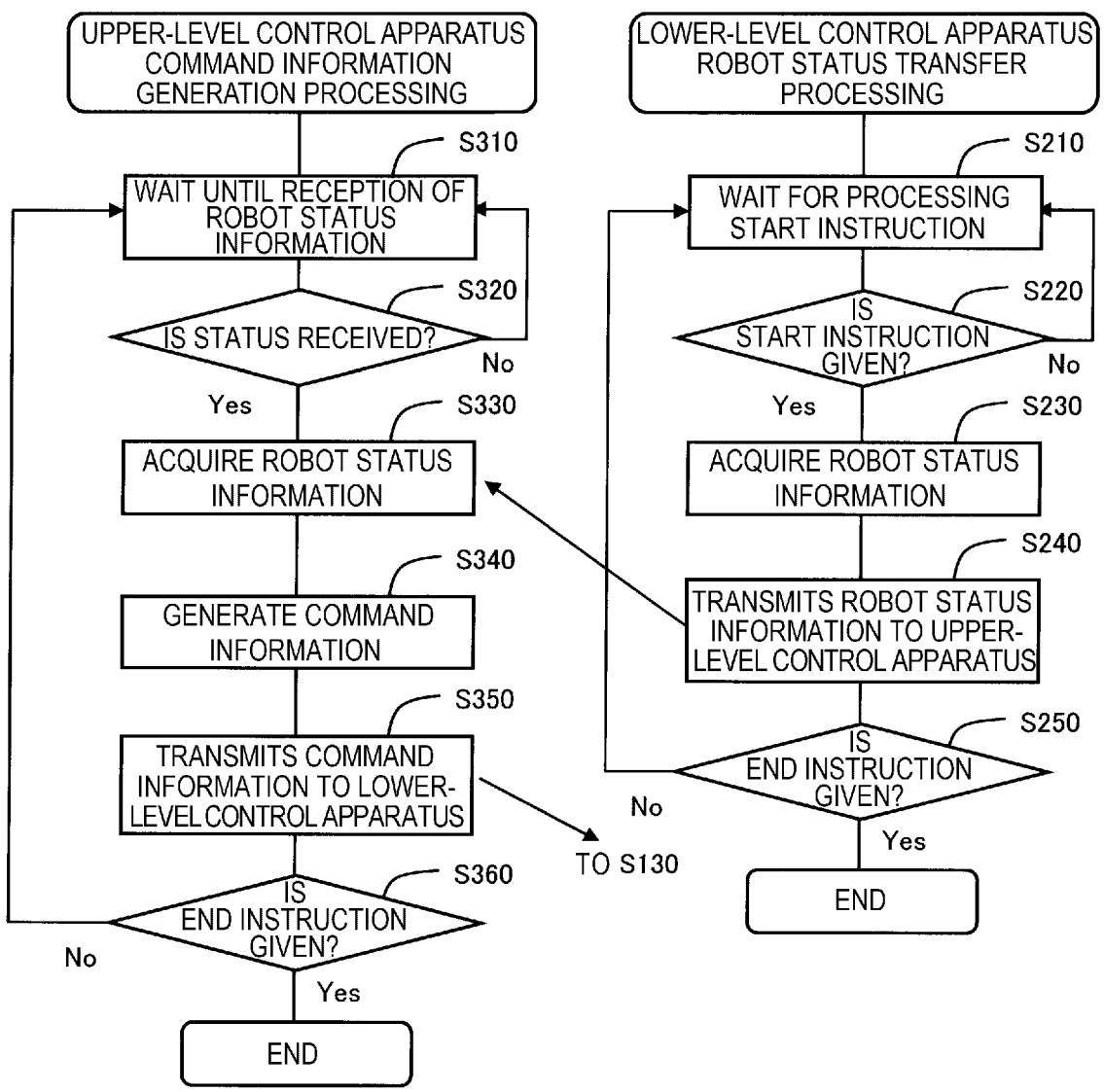
FIG. 6 is a flowchart showing a transmission and reception procedure of a robot status and a transmission procedure of command information between an upper-level control apparatus and the lower-level control apparatus.

FIG. 6 is a flowchart showing a transmission and reception procedure of the robot status information RI and a transmission procedure of the command information CI between the upper-level control apparatus 300 and the lower-level control apparatus 200. Steps S310 to S360 show processing by the upper-level control apparatus 300 and steps S210 to S250 show processing by the lower-level control apparatus 200.

At steps S210, S220, the robot status transfer unit 240 waits until reception of a processing start instruction from the real-time communication unit 230. When receiving the processing start instruction, at step S230, the robot status transfer unit 240 acquires the robot status information RI transmitted from the servo control unit 130 and, at step S240, transmits the information via the non-real-time communication unit 210 to the upper-level control apparatus 300. At step S250, whether or not the end instruction on the processing is received is determined and, when not received, the process returns to step S210 and the processing at step S210 and the subsequent steps are repeated. Note that the end instruction on the processing is transmitted from the upper-level control apparatus 300 to the lower-level control apparatus 200, for example.

At steps S310, S320, the non-real-time communication unit 320 waits until reception of the robot status information RI from the lower-level control apparatus 200. When the robot status information RI is received, at step S330, the command information generation unit 310 acquires the robot status information RI from the non-real-time communication unit 320 and, at step S340, generates the next command information CI using the robot status information RI as necessary. At step S350, the command information generation unit 310 transmits the command information CI via the non-real-time communication unit 320 to the lower-level control apparatus 200. In response to the transmission of the command information CI, the processing at step S130 and the subsequent steps shown in FIG. 5 is executed.

At step S360, the command information generation unit 310 determines whether or not an end instruction on the processing is received and, when not received, the process returns to step S310 and the processing at step S310 and the subsequent steps is repeated. Note that the end instruction on the processing is issued when a worker inputs that the work by the robot 100 is finished to the upper-level control apparatus 300, for example, in response to the input.

As described above, in the robot control system of the above described embodiment, the lower-level control apparatus 200 transmits the robot status information RI to the upper-level control apparatus 300 in synchronization with the control period of the robot, and the upper-level control apparatus 300 transmits the command information CI to the lower-level control apparatus 200 within the predetermined transmission time TT shorter than the control period of the robot from the time when receiving the robot status information RI from the lower-level control apparatus 200. According to the robot control system, the communication between the upper-level control apparatus 300 and the lower-level control apparatus 200 is performed within the transmission time TT shorter than the control period of the robot, and therefore, the lower-level control apparatus 200 may transmit the control command CC to the servo control unit 130 with respect to each control period, and a robot motion requiring responsiveness may be executed without any trouble.

OTHER EMBODIMENTS

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined for solving part or all of the problems of the present disclosure or achieving part or all of the effects of the present disclosure. The technical features not described as essential features in this specification can be appropriately deleted.

(1) According to a first aspect of the present disclosure, a robot control system is provided. The robot control system includes a robot having a servo control unit, a lower-level control apparatus transmitting a control command to the servo control unit and receiving robot status information representing a status of the robot from the servo control unit with respect to each preset control period, and an upper-level control apparatus transmitting command information for creation of the control command to the lower-level control apparatus. The lower-level control apparatus transmits the robot status information to the upper-level control apparatus in synchronization with the control period. The upper-level control apparatus transmits the command information to the lower-level control apparatus within a predetermined transmission time shorter than the control period from a time when receiving the robot status information from the lower-level control apparatus.

According to the robot control system, the communication between the upper-level control apparatus and the lower-level control apparatus is performed within the transmission time shorter than the control period of the robot, and accordingly, the lower-level control apparatus may transmit the control command to the servo control unit with respect to each control period and execute a robot motion requiring responsiveness without any trouble.

(2) In the robot control system, the upper-level control apparatus may select and execute, as processing of creating the command information, one of (i) first processing of creating the command information according to a robot control program created in advance without using the robot status information received from the lower-level control apparatus, and (ii) second processing of creating the command information using the robot status information according to the robot control program according to description in the robot control program.

According to the robot control system, the upper-level control apparatus creates the command information using the robot status information as necessary, and thereby, the lower-level control apparatus may move the robot by transmitting the control command on which the robot status information is reflected to the servo control unit.

(3) In the robot control system, when failed to receive the command information from the upper-level control apparatus until a time-out time before a time to transmit the next control command to the servo control unit, the lower-level control apparatus may create the next control command using a previous control command without using the command information and transmit the command to the servo control unit.

According to the robot control system, the robot may be moved even when the command information transmitted from the upper-level control apparatus to the lower-level control apparatus is delayed.

(4) In the robot control system, when failed to receive the command information from the upper-level control apparatus until the time-out time, the lower-level control apparatus may create the next control command by extrapolation of a plurality of control commands in the past.

According to the robot control system, even when the command information transmitted from the upper-level control apparatus to the lower-level control apparatus is delayed, the appropriate control command may be transmitted to the servo control unit.

(5) According to a second aspect of the present disclosure, a lower-level control apparatus forming a robot control system with a robot and an upper-level control apparatus is provided. The lower-level control apparatus is configured to execute (a) processing of transmitting a control command to a servo control unit of the robot and receiving robot status information representing a status of the robot from the servo control unit with respect to each preset control period, (b) processing of transmitting the robot status information to the upper-level control apparatus in synchronization with the control period, and (c) processing of receiving command information from the upper-level control apparatus and creating a next control command from the command information. In the processing (c), when failed to receive the command information from the upper-level control apparatus until a time-out time before a time to transmit the next control command to the servo control unit, creating the next control command using a previous control command without using the command information and transmitting the command to the servo control unit.

According to the robot control system, the robot may be moved even when the command information transmitted from the upper-level control apparatus to the lower-level control apparatus is delayed.

(6) According to a third aspect of the present disclosure, a control method for a robot in a robot control system including the robot having a servo control unit, a lower-level control apparatus, and an upper-level control apparatus is provided. The control method includes (a) transmitting a control command to the servo control unit and receiving robot status information representing a status of the robot from the servo control unit with respect to each preset control period by the lower-level control apparatus, and (b) transmitting command information for creation of the control command to the lower-level control apparatus by the upper-level control apparatus. At (a), the lower-level control apparatus transmits the robot status information to the upper-level control apparatus in synchronization with the control period. At (b), the upper-level control apparatus transmits the command information to the lower-level control apparatus within a predetermined transmission time shorter than the control period from a time when receiving the robot status information from the lower-level control apparatus.

According to the control method, the communication between the upper-level control apparatus and the lower-level control apparatus is performed within the transmission time shorter than the control period of the robot, and accordingly, the lower-level control apparatus may transmit the control command to the servo control unit with respect to each control period and execute a robot motion requiring responsiveness without any trouble.

The present disclosure can be realized in various other aspects than those described as above. For example, the present disclosure can be realized in aspects of a robot system including a robot and a robot control apparatus, a computer program for realization of the functions of the robot control apparatus, and a non-transitory storage medium recording the computer program, etc.

What is claimed is:

1. A robot control system comprising:
a robot having a servo control unit;
a lower-level control apparatus transmitting a control command to the servo control unit and receiving robot status information representing a status of the robot from the servo control unit with respect to a preset control period; and
an upper-level control apparatus transmitting command information for creation of the control command to the lower-level control apparatus, wherein
the lower-level control apparatus transmits the robot status information to the upper-level control apparatus in synchronization with the control period, and
the upper-level control apparatus transmits the command information to the lower-level control apparatus within a predetermined transmission time shorter than the control period from a time when receiving the robot status information from the lower-level control apparatus.

2. The robot control system according to claim 1, wherein the upper-level control apparatus selects and executes, according to description in a robot control program, as processing of creating the command information, one of
(i) first processing of creating the command information according to the robot control program created in advance without using the robot status information received from the lower-level control apparatus, and
(ii) second processing of creating the command information using the robot status information according to the robot control program.

3. The robot control system according to claim 1, wherein when failed to receive the command information from the upper-level control apparatus until a time-out time before a time to transmit the next control command to the servo control unit, the lower-level control apparatus creates the next control command using a previous control command without using the command information and transmits the command to the servo control unit.

4. The robot control system according to claim 3, wherein when failed to receive the command information from the upper-level control apparatus until the time-out time, the lower-level control apparatus creates the next control command by extrapolation of a plurality of control commands in the past.

5. A lower-level control apparatus forming a robot control system with a robot and an upper-level control apparatus, the lower-level control apparatus configured to execute:
(a) processing of transmitting a control command to a servo control unit of the robot and receiving robot status information representing a status of the robot from the servo control unit with respect to a preset control period;
(b) processing of transmitting the robot status information to the upper-level control apparatus in synchronization with the control period; and
(c) processing of receiving command information from the upper-level control apparatus and creating a next control command from the command information, wherein
in the processing (c),
when failed to receive the command information from the upper-level control apparatus until a time-out time before a time to transmit the next control command to the servo control unit, creating the next control command using a previous control command without using the command information and transmitting the command to the servo control unit.

6. A control method for a robot in a robot control system including the robot having a servo control unit, a lower-level control apparatus, and an upper-level control apparatus, comprising:
(a) transmitting a control command to the servo control unit and receiving robot status information representing a status of the robot from the servo control unit with respect to a preset control period by the lower-level control apparatus; and
(b) transmitting command information for creation of the control command to the lower-level control apparatus by the upper-level control apparatus, wherein at (a), the lower-level control apparatus transmits the robot status information to the upper-level control apparatus in synchronization with the control period, and at (b), the upper-level control apparatus transmits the command information to the lower-level control apparatus within a predetermined transmission time shorter than the control period from a time when receiving the robot status information from the lower-level control apparatus.

* * * * *